United States Patent Office 3,498,858
Patented Mar. 3, 1970

3,498,858
METHOD AND A COMPOSITION COMPRISING SILVER CARBONATE AND AMORPHOUS BORON
James E. Aker, Seymour, Ind., assignor to Standard Oil Company, Chicago, Ill., a corporation of Indiana
No Drawing. Filed Oct. 13, 1967, Ser. No. 675,035
Int. Cl. C06c 9/00; C06d 5/00
U.S. Cl. 149—22                                    7 Claims

ABSTRACT OF THE DISCLOSURE

Ignition of silver carbonate-containing propellant by contacting said propellant with a mixture comprising a major amount of silver carbonate and minor amount of boron and heating said mixture.

BACKGROUND OF THE INVENTION

This invention relates to a novel class of compositions for ignition of silver carbonate-containing propellants, and to a method for ignition of said propellants.

In aerospace applications and in military usage for rocketry and gas generation, it has been found that silver carbonate-containing propellant compositions decompose in a self-sustaining manner with a well-defined rate and with the generation of carbon dioxide gas. A representative composition and method of generation of carbon dioxide is the subject of Patent Application Ser. No. 429,108, filed Jan. 29, 1965, for W. A. Proell, and now U.S. Patent No. 3,347,629. The Proell application is directed to the self-sustaining reaction of an intimate mixture of silver carbonate and carbon wherein the silver carbonate is present in a mole ratio of 2 moles to at least 7/8 of a mole of carbon.

Although silver carbonate propellant can be initiated by means of a heated wire, for example, a heated Nichrome wire, a current requirement of approximately 10 ampers for a period of several seconds is required in order to ignite the propellant. A power requirement and time delay of this magnitude may be undesirable in certain aerospace applications.

Known igniters generally have not satisfied the following conditions: the igniter must be sufficiently similar both chemically and physically to the propellant composition to bond to it and be stable; it must be clean burning, i.e. generate only carbon monoxide and/or carbon dioxide gases; it must be capable of generating sufficient heat to reliably ignite the propellant; and it must be sufficiently reactive so as to require little power for initiation itself.

SUMMARY OF INVENTION

I have now discovered a novel composition and method for the ignition of silver carbonate propellants having the advantage of power requirements significantly less than required by the hot wire method above-mentioned and meeting all the requirements above-outlined. Briefly stated, the novel ignition composition comprises a thin layer of an intimate mixture of a major amount of silver carbonate and a minor amount of boron. This mixture may be used to initiate ignition in a silver carbonate propellant by heating the mixture which is in contact with said propellant.

It is desirable that the mixture of boron and silver carbonate be prepared in a thin layer and pressed on the surface of the propellant which is to be ignited. This bonding procedure should be performed as the propellant grain is formed. The layer of igniter material is sufficiently similar, chemically and physically, to the propellant so that it does not separate when subjected to shock or temperature gradients. It is preferred that the boron be in amorphous form.

An advantageous mixture of the novel composition of the persent invention comprises from about 2% by weight to about 25% by weight of boron and correspondingly about 98% by weight to 75% by weight of silver carbonate. In the preferred embodiment, boron is present in about 4–8 weight percent, with about 5 weight percent being most preferred. The ratios of boron to silver carbonate may be varied greatly depending upon the desired results, i.e., a higher boron content will result in increased reactivity.

The initiation of a propellant having the composition of the present invention pressed thereon occurs quite readily. Generally, initiation may be accomplished by heating a wire in contact with igniter composition by passing a current through the wire for a short period of time. A Nichrome wire is particularly desirable.

DESCRIPTION OF THE PREFERRED EMBODIMENT

Example 0.2 gram of a blended igniter mixture consisting of 5% amorphous boron and 95% silver carbonate was prepared by blending the finely divided silver carbonate and the boron (finer than 100 mesh) in a ball mill for approximately 30 minutes. It was then pressed upon the surface of a 3/8 inch diameter by 1-inch long silver carbonate-carbon propellant grain. The ignition layer was bonded to the propellant as the propellant was formed. The propellant powder was placed in a properly-sized cavity, and the ignition powder was added on top of the propellant. The powders were then compacted with a hydraulic press at ambient temperature. The pressure was in the range of 60,000 to 90,000 p.s.i. It is possible to use greater than 30,000 p.s.i. for compacting. Initiation of decomposition of the propellant was accomplished by passing a current of 3 amperes through a .005 inch diameter Nichrome wire in contact with the ignition material for a period of less than .05 second.

What is claimed is:

1. An igniter composition comprising an intimate mixture of a major amount of silver carbonate and a minor amount of amorphous boron wherein said silver carbonate is present in an amount of from 75 to 98 percent by weight, and said boron is present in an amount from 2 to 25 percent by weight.

2. The composition of claim 1 wherein said boron is present in an amount of from 4 to 8 percent by weight.

3. The composition of claim 1 wherein said silver carbonate and said boron have a particle size smaller than 100 mesh.

4. A method for igniting a silver carbonate-containing propellant composition comprising the steps of: (a) bonding the igniter composition of claim 1 to said propellant composition; and (b) heating said igniter composition to a temperature sufficient to initiate decomposition of said igniter composition.

5. A method for igniting a silver carbonate-containing propellant composition comprising the steps of: (a) bonding the igniter composition of claim 1 to said propellant composition, said igniter composition being in contact with a wire having a high resistance; and (b) passing a current through said wire, said current sufficient to heat said wire to a temperature sufficient to initiate decomposition of said igniter composition.

6. A composition comprising: (a) a silver carbonate-containing propellant; and (b) a thin layer of the igniter composition of claim 1, bonded to said propellant.

7. The composition of claim 6 wherein said silver carbonate-containing propellant comprises an intimate mixture of silver carbonate and carbon, said silver carbonate being present in a mole ratio of 2 moles to at least 7/8 mole of carbon.

References Cited

UNITED STATES PATENTS

| | | | |
|---|---|---|---|
| 3,174,936 | 3/1965 | Gustafson et al. | 149—22 X |
| 3,240,640 | 3/1966 | Ives | 149—22 X |
| 3,257,801 | 6/1966 | Martinez et al. | 149—22 X |
| 3,286,628 | 11/1966 | Young et al. | 149—22 X |
| 3,347,629 | 10/1967 | Proell | 23—150 |

CARL D. QUARFORTH, Primary Examiner

M. J. SCOLNICK, Assistant Examiner

U.S. Cl. X.R.

102—23, 70; 149—109